July 31, 1923.
C. A. CLASE
MICROMETER GAUGE
Filed Sept. 20, 1921
1,463,673
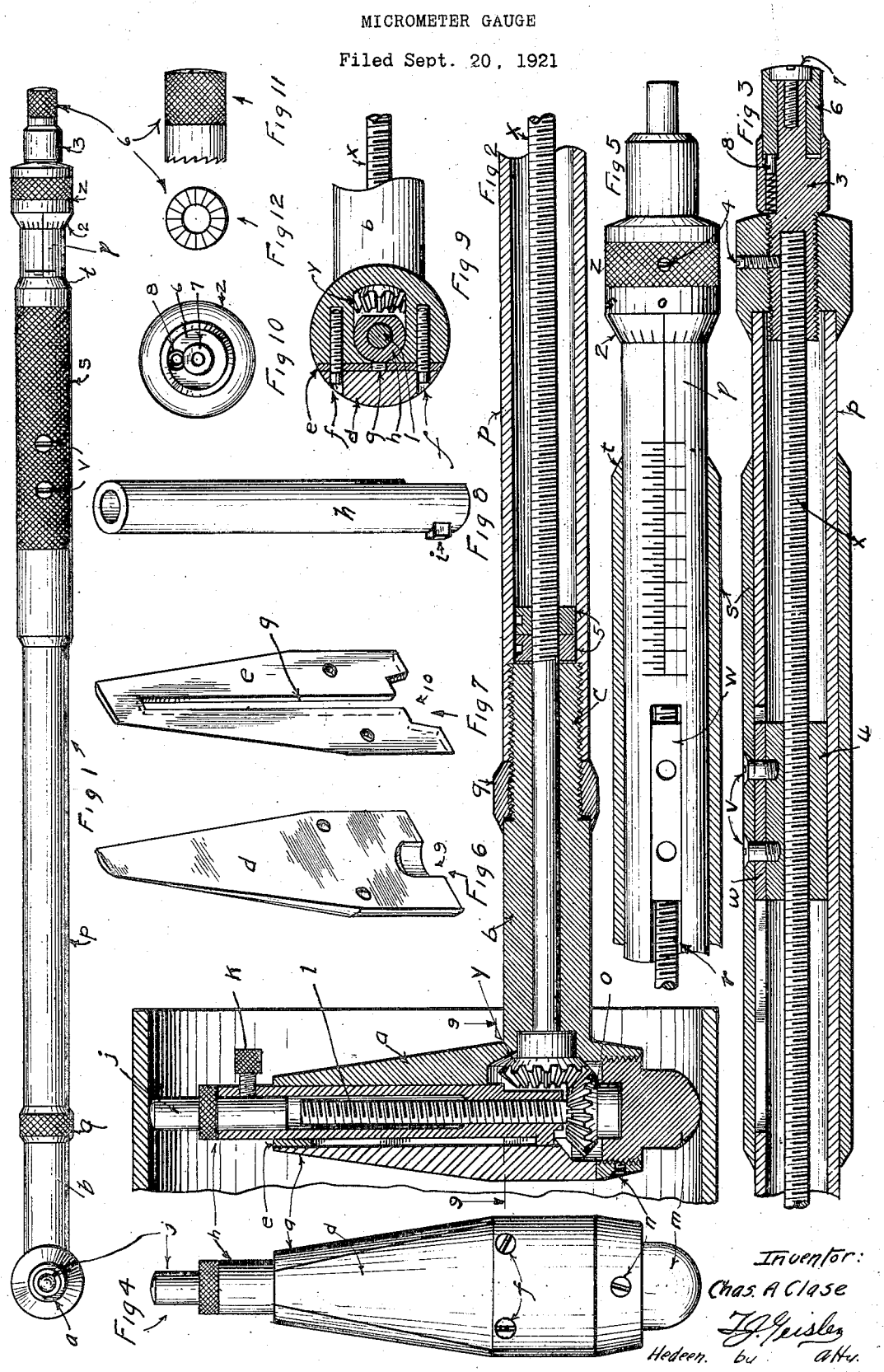
Inventor:
Chas. A. Clase
Hedeen. by J. G. Geisler Atty.

Patented July 31, 1923.

1,463,673

UNITED STATES PATENT OFFICE.

CHARLES A. CLASE, OF PORTLAND, OREGON.

MICROMETER GAUGE.

Application filed September 20, 1921. Serial No. 501,969.

*To all whom it may concern:*

Be it known that I, CHARLES A. CLASE, a citizen of the United States, and a resident of Portland, county of Multnomah, and State of Oregon, have invented a certain new and useful Improvement in Micrometer Gauges, of which the following is a specification.

The object of my invention is to provide an efficient micrometer gauge for measuring inside diameters which do not permit ready access, and to make the construction of my device as inexpensive as possible.

A further object is to provide an instrument by which adjustments can be made, and readings taken, from an outside position, and more quickly and simply than heretofore.

Among the specific features provided in my micrometer gauge are the following: There are no threads exposed; only two mitre gears are required; the device has only few wearing parts; the bearing surfaces are of considerable length thereby retaining accuracy; the operating parts are enclosed against dust and dirt.

The above objects are attained by the novel features of construction, combination and arrangements of parts fully shown in the accompanying drawings, in which:

Fig. 1 is an elevation of my micrometer gauge;

Fig. 2 is a larger scaled cross section of one end of the gauge;

Fig. 3 is a similar view of the other end of the gauge;

Fig. 4 is an end elevation of that portion of the gauge shown in Fig. 2;

Fig. 5 is a plan view of the parts shown in Fig. 3;

Figs. 6, 7 and 8 are perspective views of certain of the parts used in the measuring head assembly;

Fig. 9 is a horizontal section taken on the line 9—9 of Fig. 2;

Fig. 10 is a right end elevation of the parts shown in Fig. 5;

Fig. 11 is a side elevation of the ratchet; and

Fig. 12 is an end elevation of the same.

Referring to these drawings, the detailed construction of my improved micrometer gauge is substantially as follows:

$a$ represents a measuring head having an integral, perpendicular, arm $b$, the latter made with a threaded end $c$. The head $a$ is made in the form of a housing adapted to hold the contact points of the gauge, and to this end is provided with a cover $d$ and an intermediate guide plate $e$. Screws $f$ hold these parts in proper related position. The plate $e$ is made with a slot $g$, and a tubular member $h$ is positioned centrally in the head $a$, being held against rotation by a lug $i$ bearing in the slot $g$. Said tubular member $h$ is however, capable of longitudinal movement in the bore of the head $a$. A contact point member $j$ is made in the shape of a pin adapted to fit the upper end of the tubular member $h$, and is locked in position by a set screw $k$.

The lower end of the member $h$ is threaded internally, and a screw $l$ works in said threaded portion. As said screw turns, the tubular member $h$, carrying the contact point $j$ will move longitudinally in the head.

In the opposite end of the head $a$ is threaded a stationary contact point $m$ which is locked by a set screw $n$. This contact point provides a bearing for the lower end of the screw $l$. A bevel gear $o$ is fixed on this end of the screw and forms one member of a transmission mechanism, the supplementary parts of which will be detailed hereafter.

Threaded on the arm $b$ is a barrel $p$. Said barrel is locked against rotation by a knurled nut $q$. The barrel is further provided with a longitudinal slot $r$. A sleeve $s$ is made with a sliding fit on the barrel $p$ and the beveled end $t$ of said sleeve is adapted to cooperate with certain graduations on the outside of the barrel. A nut $u$ is adapted to slide in the barrel $p$ and is rigidly secured to the sleeve $s$ by screws $v$. A filler piece $w$ the width and thickness of the slot $r$ permits convenient assembly of these parts. It will thus be seen that the sleeve $s$ can move longitudinally on the barrel $p$, but is held from rotary movement by the filler piece $w$.

The nut $u$ is threaded internally, and a screw $x$ is adapted to work in said thread. This screw has a bearing at one end in the hollow bored arm $b$, and on its forward end is fixed a bevel gear $y$, engaging with and adapted to drive the gear $o$. It is obvious that as the screw $x$ is turned, the contact point $j$ will move accordingly, and the sleeve $s$ will slide on the barrel $p$ and register the relative movement of the said contact point, by means of predetermined graduations. Lock nuts 5 on the inner end of the screw prevent end movement of the latter.

As a means for turning the screw $x$, I provide the following: A knurled thimble 2 is adapted to fit the end of the barrel p. Said thimble is made with a graduated beveled edge 2, adapted to register with an index line on the barrel so as to indicate degrees of rotary movement of the screw. This thimble is threaded internally, and a screw plug 3 fits in said threaded portion. The plug is bored out so as to provide a seat for the outer end of the screw x, the latter being locked securely in position by the set screw 4. On the outer end of the plug 3 is rotatably mounted a knurled ratchet 6, which is held in place by screw 7 and controlled by the spring and pin numbered 8.

My device operates as follows:

Coarse adjustment of the contact points may be made by turning the thimble 2. When the micrometer has been set approximately correct the operator rotates the barrel p by grasping the ratchet 6 and continuing the rotation. The barrel will continue to rotate until the points contact against the parts being measured. The ratchet 6 will then slip in relation to the screw plug 3 because the spring in pin 8 will pass over the toothed face of the ratchet and prevent further rotation.

It is obvious that longer contact pins may be used so as to increase the range of application of the gauge.

The lower part of both the removable side of the measuring-head and of the guide plate are cut out as shown at 9 and 10 in Figs. 6 and 7, respectively, so as to accommodate the mitre gear o.

I claim:

1. In a micrometer gauge, the combination of an elongated hollow handle provided with a hollow measuring head; perpendicular to said handle and rigidly secured thereto, said handle being provided with a slot, extending longitudinally thereof, a screw journaled in the handle and having one end of the screw extending into said measuring head and the opposite end extending beyond the handle, a nut mounted on the screw within the hollow handle and having a lug adapted to ride said slot, a sleeve mounted on the handle and connected with said nut thru said slot, the exterior of the handle being calibrated, means on that end of the screw projecting without the handle for rotating the screw, a mitre gear mounted on that end of the screw extending into said head, a second mitre gear journalled in said head on an axis normal to that of the screw in the handle, said second gear meshing with the first mentioned gear, a screw carried by the second mitre gear and extending longitudinally of said head, a tubular member threaded on the latter screw and being adapted for longitudinal movement in the measuring head, said head being provided at one end with a removable contact point, and a second contact point removably carried by said tubular member at the other end of said head.

2. The combination set forth in claim 1 distinguished in that the measuring head is provided with a slotted guide-plate and the tubular member has a lug, bearing in said guide plate, to hold the tubular member against rotation.

3. In a micrometer gauge the combination of a hollow handle provided with a hollow measuring-head, secured perpendicularly to said handle, a screw journalled in the handle and having one end extending into said measuring head, a nut mounted on said screw and held against rotation therewith, an indicating sleeve mounted on the handle and connected with said nut, a mitre gear mounted on that end of the screw, extending into said head, a second mitre gear journalled in said head on an axis normal to that of the screw in the handle and meshing with first mentioned mitre gear, a member carried by the second mitre gear, a member adapted for longitudinal movement in the measuring-head by the rotation of said member, carried by the second mitre gear, means holding said longitudinally movable member against rotation, said head provided at one end with a contact point, a second contact point carried by said longitudinally movable member in the other end of said head.

4. In a micrometer gauge the combination of a hollow handle provided with a hollow measuring-head secured perpendicularly to said handle, a screw journalled in the handle and having one end extending into said measuring head, a nut mounted on said screw and held against rotation therewith, an indicating sleeve mounted on the handle and connected with said nut, a mitre gear mounted on that end of the screw extending into said head, a second mitre gear journalled in said head on an axis normal to that of the screw in the handle and meshing with first mentioned mitre gear, a member carried by the second mitre gear, a member adapted for longitudinal movement in the measuring-head by the rotation of said member carried by the second mitre gear, said head being provided at one end with a contact point, a second contact point carried by said longitudinally movable member in the other end of said head the measuring head being made with a removable side, and a slotted guide plate, and the longitudinally movable member being provided with a lug bearing in said guide plate.

5. In a micrometer gauge the combination of, a handle provided with a measuring head perpendicular to said handle and rigidly secured thereto, a micrometer screw carried by said handle, a second micrometer screw extending longitudinally of said head, means for transmitting the rotary motion of said first mentioned screw to said second mentioned screw, a sleeve threaded on the latter screw, such sleeve carrying a contact point, and means for holding the sleeve against rotating.

6. In a micrometer gauge the combination of, a handle provided with a measuring head perpendicular to said handle, a micrometer screw carried by said handle, a second micrometer screw extending longitudinally of said head, means for transmitting the rotary motion of said first mentioned screw to said second mentioned screw, a sleeve threaded on the latter screw, such sleeve carrying a contact point, a slotted plate extending longitudinally of said measuring head, one side of the measuring head being removable to receive said plate and said sleeve having a lug bearing in the slot of said plate.

CHARLES A. CLASE.